Aug. 6, 1940.  C. FRITSCHI  2,210,578
METHOD AND APPARATUS FOR PRODUCING STEREOTYPE MATRICES
Original Filed May 5, 1937  8 Sheets-Sheet 7

Fig. 5.

INVENTOR.
Charles Fritschi.
BY
Earl D. Roder.
ATTORNEY

Aug. 6, 1940.  C. FRITSCHI  2,210,578
METHOD AND APPARATUS FOR PRODUCING STEREOTYPE MATRICES
Original Filed May 5, 1937   8 Sheets-Sheet 8

Fig. 5a.

INVENTOR.
Charles Fritschi.
BY Earl J. Rader
ATTORNEY

Patented Aug. 6, 1940

2,210,578

UNITED STATES PATENT OFFICE 2,210,578

METHOD AND APPARATUS FOR PRODUCING STEREOTYPE MATRICES

Charles Fritschi, Riverside, Conn.

Application May 5, 1937, Serial No. 140,885
Renewed April 26, 1940

11 Claims. (Cl. 101—12)

This invention relates to the production of stereotype matrices and more especially to a novel method of and means for dehydrating matrices by means of suction while they are under a heat treatment and subjected to pressure induced by the action of suction.

According to one of the present day methods for producing sterotype matrices, the molding and drying operations are accomplished within the matrix press as successive steps of one operation during which the matrix is molded under relatively high pressure and dehydrated under reduced pressure by means of electrically energized or steam supplied heating units. This method produces excellent work, but is subject to the drawback that only one matrix may be dried at one time with the result that the whole machine is monopolized by a single matrix throughout the molding and drying treatment.

According to another method in use at the present time, the matrix is molded in a matrix press and then transferred with the form and drying blankets to a steam table or other drying apparatus. While this method permits the removal of the molded matrix to a separate drying table for the dehydration treatment and thus renders the press available for use on another matrix form, it necessitates the release of pressure on the matrix during its transfer from the molding press to the drying press and inasmuch as the matrix is liable to become disarranged during this transfer, the increase in production over that secured by the first method is accompanied by an ever present risk of making a "double impression." Furthermore additional floor space must be provided to accommodate the drying presses and this drawback together with the inconvenience of handling heavy forms during their transfer from one press to another renders this procedure objectionable.

According to a third method in use at the present time, the matrix is molded in a matrix press and then dried in a flat or curved "roaster." This treatment produces considerable shrinkage in the matrix and for this reason is not suitable for high grade work.

I propose in a general way to provide a novel method and means of improved construction for producing high grade stereotype matrices more rapidly and with greater facility than is possible in present well known matrix-forming machines.

For this purpose, I propose to provide a novel duplex arrangement of matrix-dehydrating devices with respect to a centrally disposed matrix-molding press whereby two matrix-dehydrating treatments on two different matrices may be had simultaneously or whereby one matrix may be subjected to a dehydration treatment while another matrix is being molded in the press.

I propose further to provide a novel method and means of improved construction whereby successive molding and dehydrating treatments may be applied to one and the same matrix in the same machine without danger of producing a double impression.

I propose further to provide a novel method and means of novel construction for utilizing suction for applying regulated pressure to a freshly molded matrix in the presence of heat for rapidly and completely drying said matrix without undue shrinkage for the purpose of producing stereotype matrix molds suitable for high grade work.

In a general way therefore, the object of my invention is to provide a novel method and means of novel construction for producing matrices of improved quality for high grade stereotype printing; for expediting the production of matrices; for economizing time and effort in the manufacture of said matrices.

One of the objects of my invention is to provide an improved duplex arrangement of matrix-dehydrating devices with respect to a centrally arranged matrix-molding press whereby the same or different operations may be performed simultaneously on two different matrices; whereby the derangement of parts due to their transfer from press to drying apparatus may be avoided and "double impressions" obviated; and whereby the treatment may be carried on under the most advantageous conditions.

A further object of my invention is to provide a matrix-dehydrating unit of novel form movable into a molding press for molding the matrix, and removable therefrom for the separately performed dehydrating action thereon and comprising a form assembly, heating table therefor, a vapor-exhausting plate to be applied to the matrix and blankets of the form assembly, and suction connections for said vapor-exhausting plate whereby the suction employed for removing the exhaust vapors may be utilized for applying a regulated pressure to the form assembly during the dehydrating treatment.

With these and other objects in view which will readily appear as the nature of my invention is better understood, the same consists in the improved and novel arrangement and combination of parts which will be hereinafter described and particularly pointed out in the appended claims.

In the accompanying drawings has been illustrated a simple and preferred form of my invention, it being understood however that no limitation is necessarily made to the precise structural details therein shown, but that alterations and modifications within the scope of the appended claims may be resorted to when desired.

Figure 1:
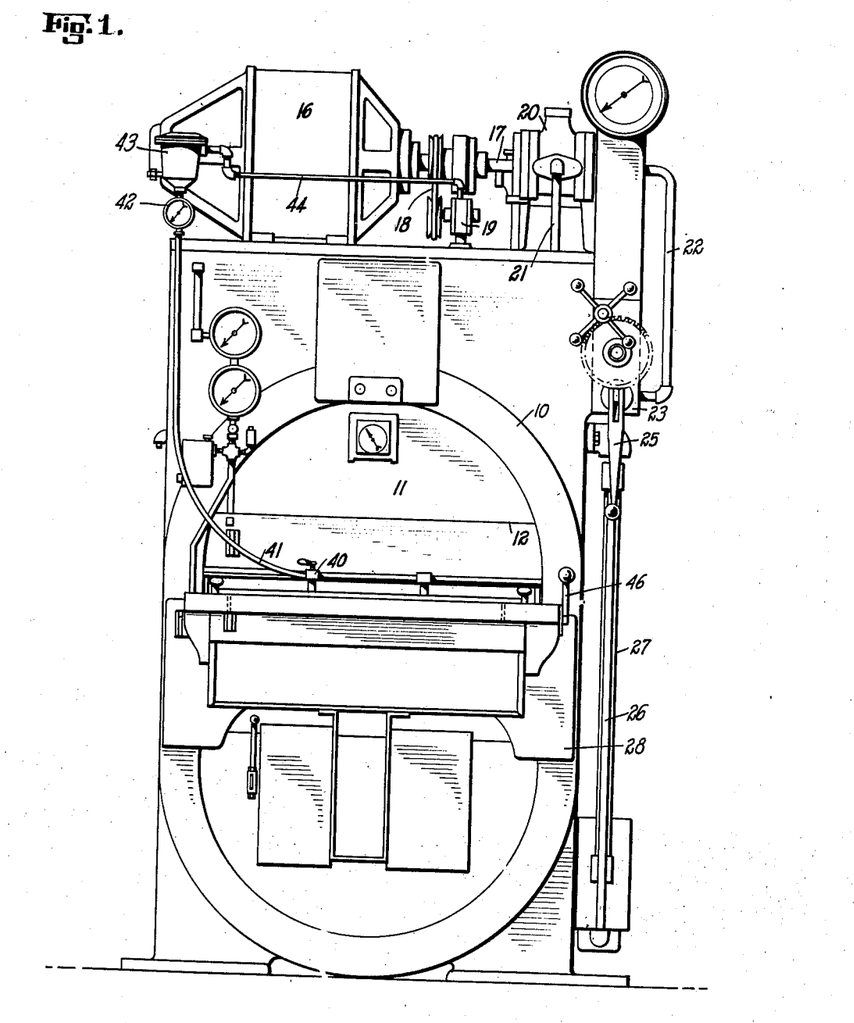
Fig. 1 is an end elevation of a matrix-molding machine provided with matrix-molding and drying means constructed in accordance with my invention and for applying my improved method to the production of stereotype matrices.
Figure 2:
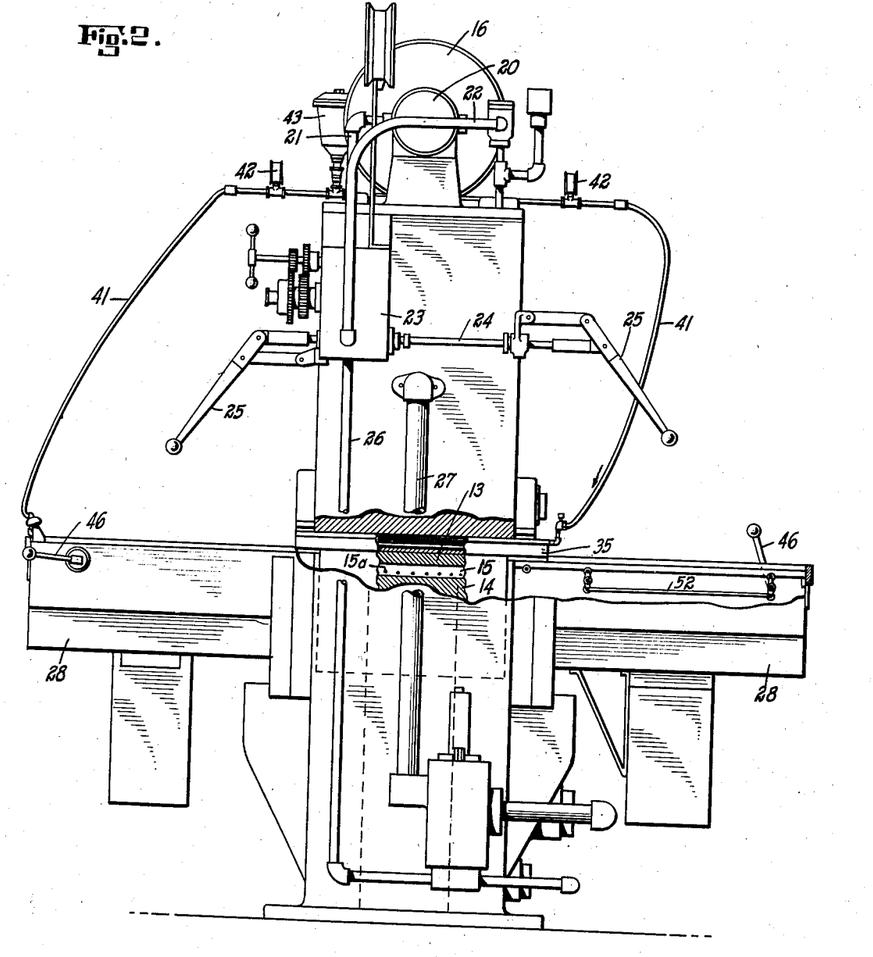
Fig. 2 is a side elevation of the matrix-molding machine shown in Fig. 1, parts being broken away and parts shown in section.
Figure 5:
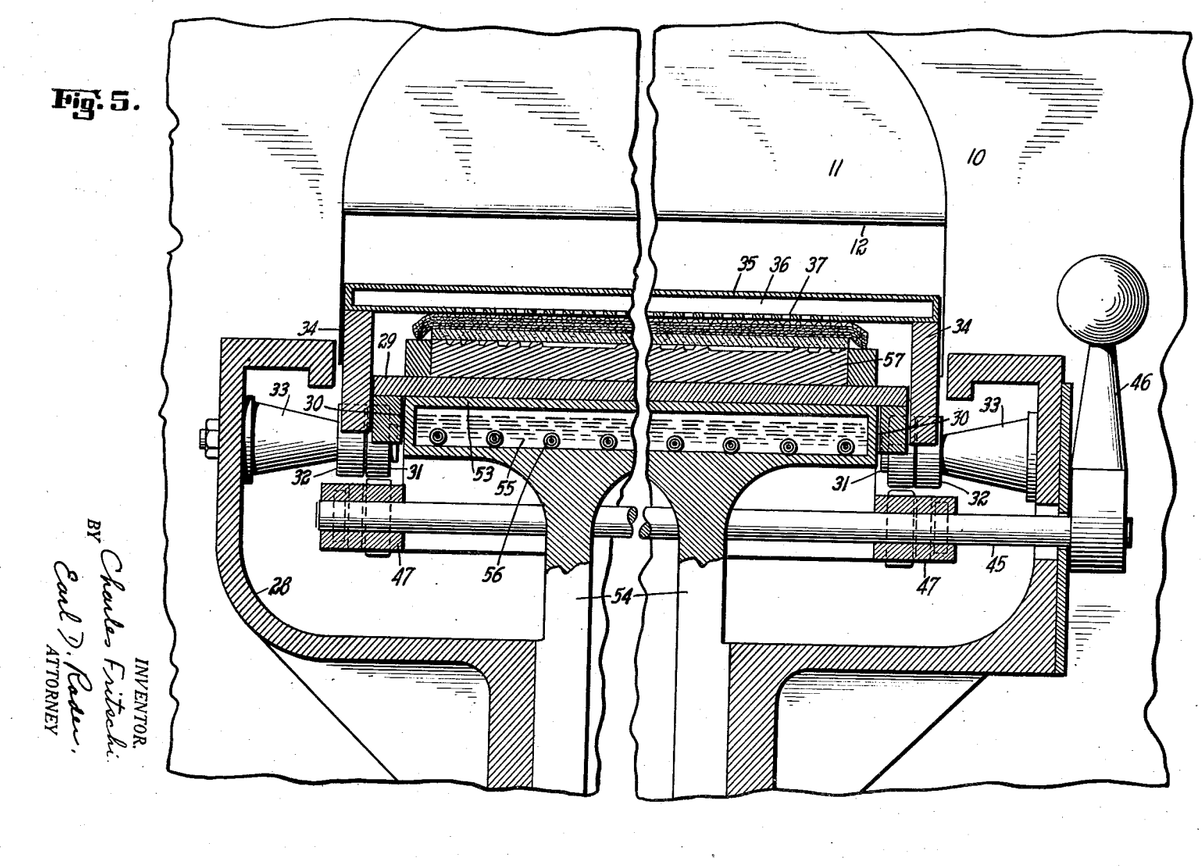
Fig. 5 is an enlarged cross section of the bed frame and heating table at either end of the machine, form assemblies shown in matrix-drying position in respect thereto, parts being broken away and parts being shown in elevation.

As shown in Fig. 1 of the drawings, the main frame of the matrix-molding machine includes a substantially oval stress absorbing frame 10 of high tensile strength and a segmental portion 11 provided with a flat chordal surface 12 forming the top platen of the hydraulic press. As shown in Figs. 2 and 5, a movable platen 13 of usual construction, is arranged at the top of a hydraulic plunger 14 and provided with a steam heating chamber 15 in which a plurality of electrical heating elements 15a are disposed for supplying heat to the form assembly during the matrix-molding operation. Mounted at the top of the matrix press is a motor 16 with an armature shaft 17 connected by belt 18 to a suction pump 19. An oil pump 20, which is directly coupled to the armature shaft 17, supplies oil under pressure from a reservoir in the upper portion of the matrix press housing, a suction pipe 21 being arranged to convey oil to said oil pump. Said oil pump is connected through a valve housing within which a valve (not shown) is actuated by a reciprocatory valve rod 24 provided with hand levers 25 for controlling the supply of oil under pressure to a service pipe 26 which leads to the hydraulic press. The oil pump is connected by a delivery pipe 22 (Fig. 2) to the valve housing 23. A return pipe 27 is provided for returning the oil to the reservoir after each operation of the press.

Figure 3:
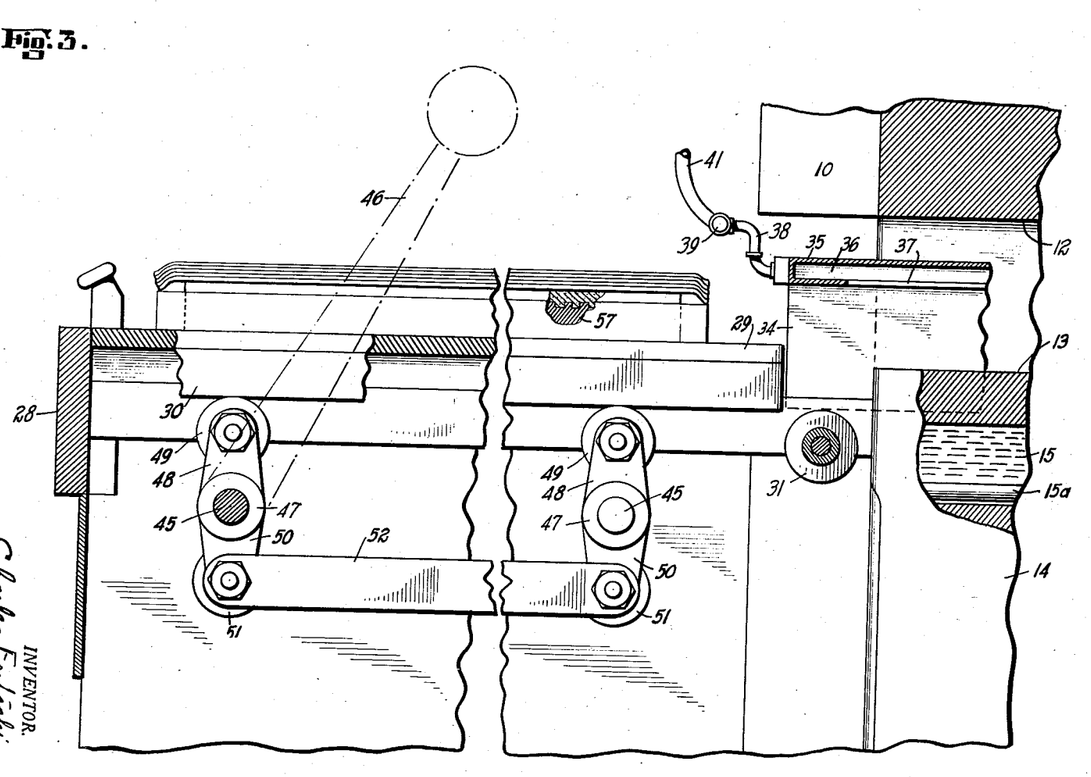
Fig. 3 is an enlarged side elevation of one end of the matrix-molding machine showing the form assembly set up prior to the placement of the vacuum plate thereon in preparation for insertion in the matrix-molding press, parts being broken away and parts shown in section.
Figure 3A:
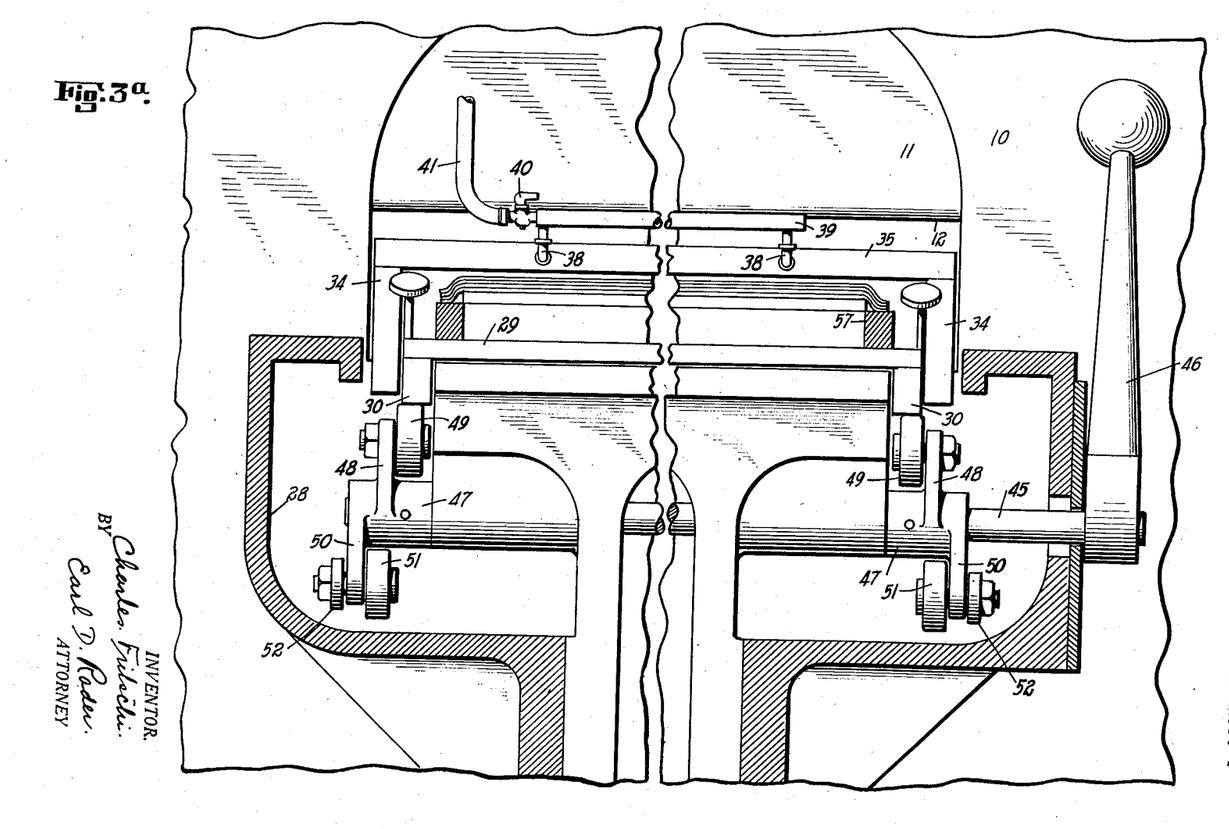
Fig. 3a is an end elevation of the assembly shown in Fig. 3, parts being broken away and adjacent portions of the frame being shown in section.
Figure 4:
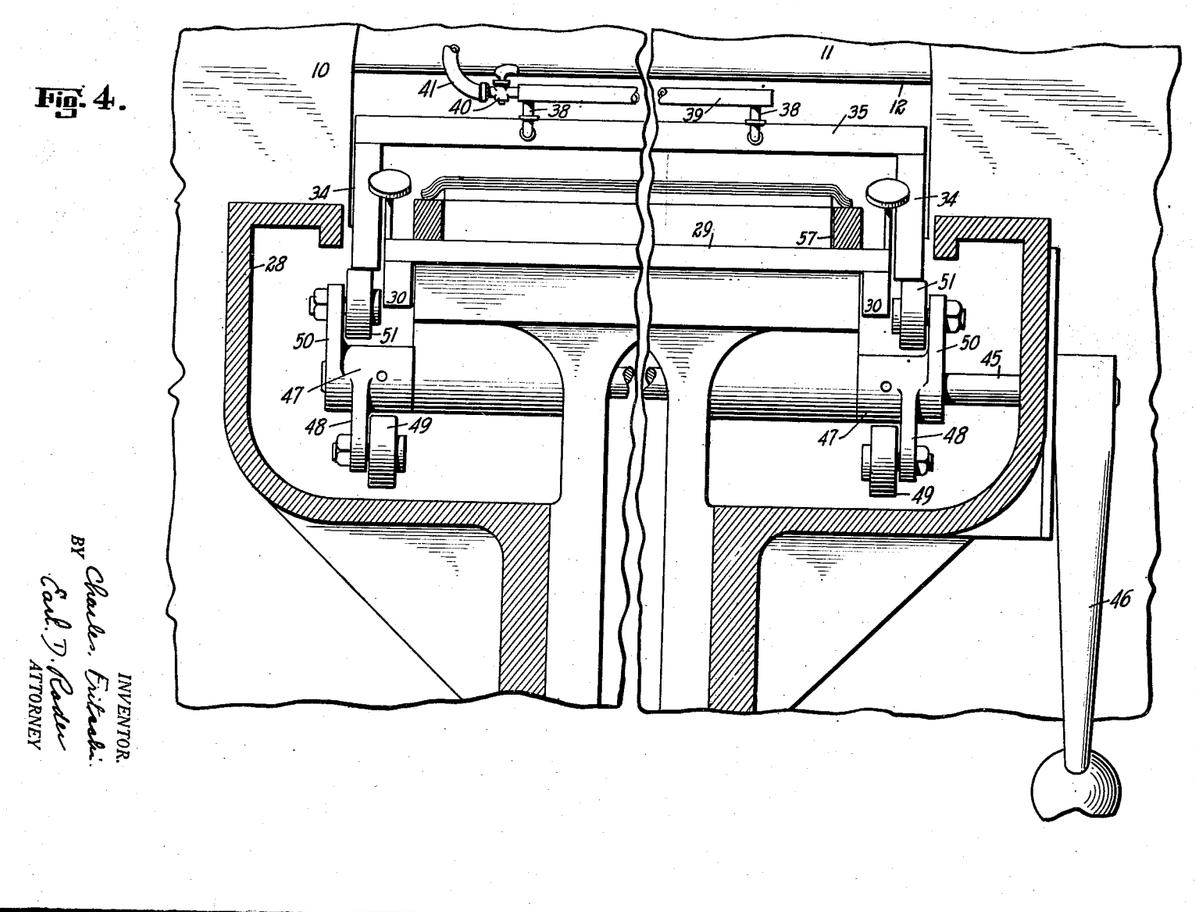
Fig. 4 is an end elevation and cross section similar to Fig. 3a with the form assembly shown in its lowermost position and the vapor-exhausting plate in raised position above the form assembly.

Referring now to Fig. 2 of the drawings, it will be seen that a rigid horizontal frame or bed 28 is mounted in the stress absorbing frame 10 and projects forwardly and rearwardly therefrom. As shown in Figs. 3a, 4 and 5, the upper portion of this bed frame is of trough-like cross section for accommodating two form-supporting plates 5 whereby the form assembly may be transferred to and fro between the matrix press and the form heating tables at opposite ends of the bed frame 28 in the manner to be hereinafter described, the construction and arrangement of the parts being such that one of the form assemblies may be disposed within the matrix press as shown at the center of Fig. 2, while the other form assembly which is shown at the left in Fig. 2 is being dehydrated in the manner to be hereinafter pointed out. It will be understood therefore that these operations may be carried on in such a way as to practically double the output of the matrix press.

Inasmuch as the matrix-molding and drying assemblies are substantially the same in construction, relative arrangement and movement of the parts, a description of one will suffice for both. Figs. 3 and 3a of the drawings show the relative disposition of the parts in one of the matrix-molding assemblies at the initial stage of the matrix-forming operation as hereinafter explained. According to the particular embodiment of my invention shown herein, a form-supporting carriage comprising a top plate 29 and laterally spaced side bars 30, is movable to and from the hydraulic press, and for this purpose a pair of coaxially mounted rollers 31 are arranged to rotatably engage the bottom edges of side bars 30 when the form-supporting carriage is in raised position. Journalled coaxially with the rollers 31 at the inner ends of frusto-conical brackets 33 are rollers 32 which are suitably arranged to rotatably engage the bottom edges of laterally spaced side plates 34 of a vacuum plate carriage when said vacuum plate carriage is in its raised position. Said vacuum plate carriage comprises the side plates 34 and a vacuum plate 35 having a vacuum chamber 36 provided with suction intakes 37 which are preferably in the form of elongated slots in the bottom wall of said vacuum chamber. Leading from the vacuum chamber 36 as shown in Figs. 3a, 4a, and 5a, are laterally spaced goose neck connections 38 which are in open communication with a suction manifold 39, said suction manifold being provided with a hand valve 40 for regulating the suction produced therein by suction pump 19 operating through tubular connection 41, suction gage 42, moisture eliminator 43, and a pipe 44 to the suction pump 19.

Figure 4A:
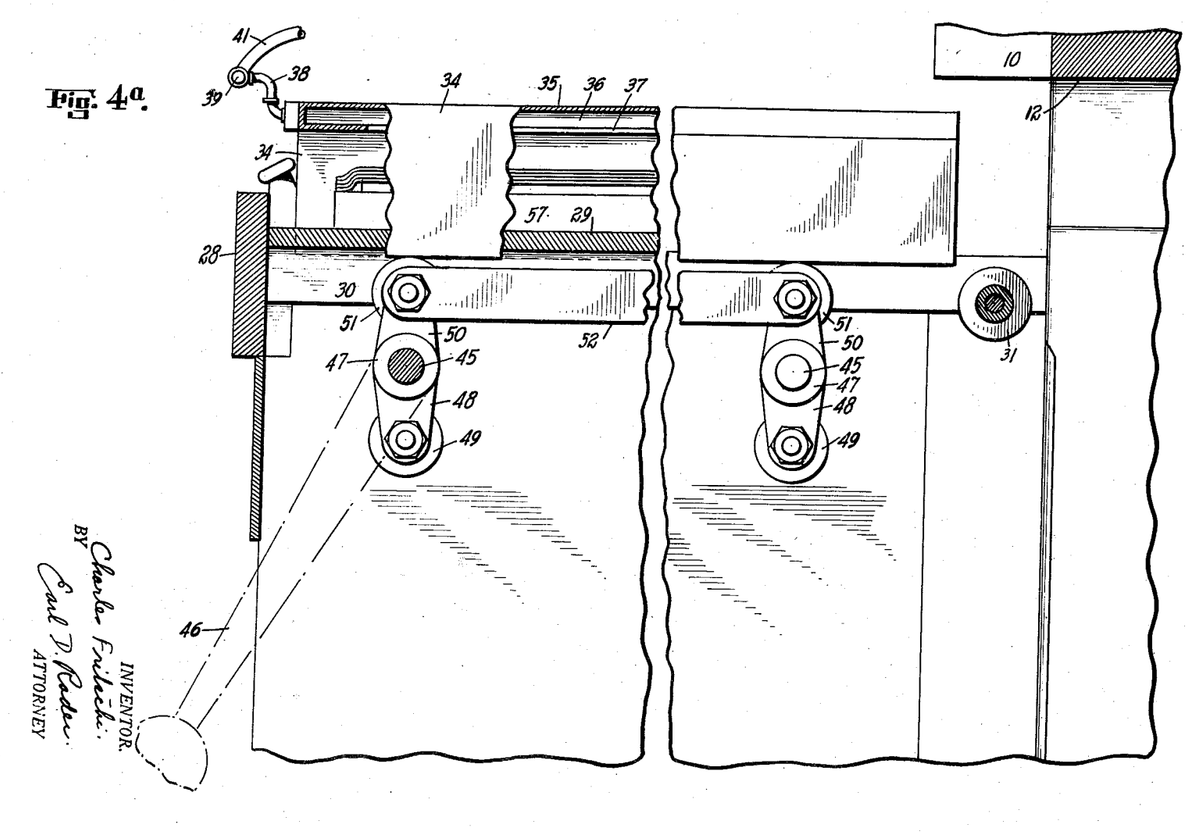
Fig. 4a is a side elevation similar to Fig. 3 showing the several parts in relative positions as shown in Fig. 4, parts being broken away and parts shown in section.

It will be understood from an inspection of Figs. 3 and 4a that the form-supporting plate 29 is movable vertically between an upper level shown in Fig. 3 and a lower level shown in Fig. 4a. It will be similarly understood from an inspection of Figs. 4a and 5a that vacuum plate 35 is movable vertically between an upper level shown in Fig. 4a and a lower level shown in Fig. 5a. Mechanism of simple and effective construction for raising and lowering the form-supporting and vacuum plate carriages for the purposes hereinafter explained, may be provided as follows.

Referring more especially to Figs. 3 and 3a of the drawings, a pair of rock shafts 45 are suitably mounted within the bed frame 28 to oscillate about fixed transverse axes in a common horizontal plane, one of said rock shafts being provided at one end with a hand lever 46. Mounted on each of said rock shafts are laterally spaced levers of the first class comprising hub portions 47 keyed to the rock shafts, elevator arms 48 provided with rollers 49 for raising and lowering the form-supporting carriage, and elevator arms 50 provided with rollers 51 for raising and lowering the vacuum plate carriage. Extending between and connected at opposite ends to the elevator arms 50 on opposite sides are connecting rods 52 by means of which the rock shafts 45 are constrained to rock in unison when actuated by hand lever 46.

Figure 5A:
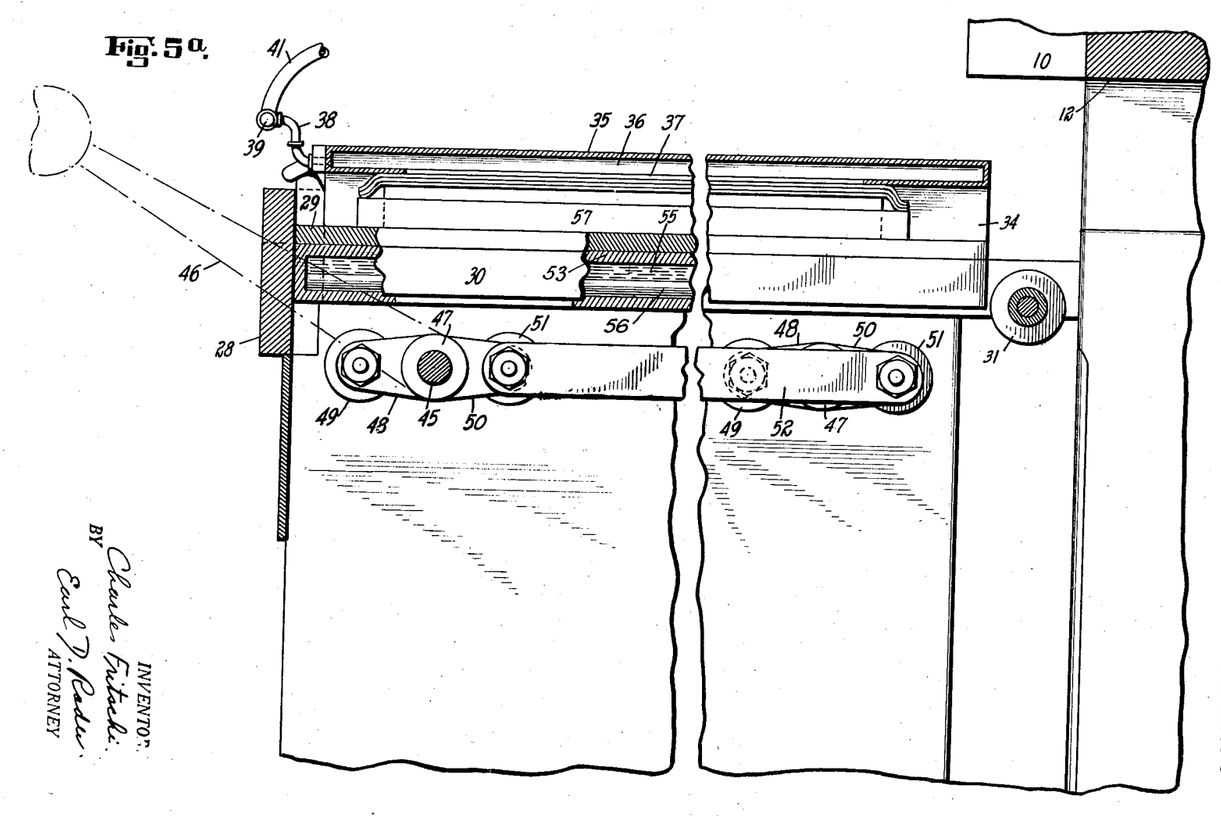
Fig. 5a is a combined side elevation and longitudinal section of the general assembly shown in Fig. 5.

Referring now to Figs. 5 and 5a of the drawings, at either end of the machine is provided a heating table 53 which is carried by an intermediately arranged portion 54 of the frame structure, said heating table being provided with a chamber 55 for water or other suitable heating fluid. Arranged within the chamber 55 according to the particular embodiment of my invention illustrated in the drawings, are a plurality of electrical heating units 56 for producing any desired heating effects.

When the matrix-forming machine is not in use, the form and vacuum plate carriage are disposed within the hydraulic press. When it is desired to mold a stereotype matrix of any prescribed form, the hand lever 46 is moved to its position shown in broken line in Fig. 3 to arrange the form elevator rollers 49 in a common tangential plane with the transfer rollers 31 and 32. The form carriage is then moved to the outer end of the bed frame and while the form plate 29 is retained at its upper level, the required form 57 is mounted thereon and covered with suitably conditioned flong. This having been done, the molding and drying blankets are placed upon the flong, the form carriage then being lowered to its lower level by shifting the hand lever 46 to its broken line position shown in Fig. 4a. The downward movement of form elevator rollers 49 is accompanied by the upward movement of rollers 51 to their uppermost positions shown in Fig. 4a. The vacuum plate carriage is now drawn from the press into position directly over the lowered form after which the lever 46 is returned to its uppermost position during which movement the vapor-exhausting plate falls until it comes to rest upon the form assembly, the latter continuing its upward movement until the lower edges of side bars 30 reach the common tangential plane at the top of guide rollers 31 and 32. The entire assembly is now moved into position within the hydraulic press, hydraulic pressure being applied thereto to produce the mold. At the same time, vacuum is applied to the mold by a hand operation of the valve 40, and after this has been done, the hydraulic pressure is reduced to a required amount and maintained at the reduced pressure for a predetermined period of time, for example, about forty seconds. The purpose of this procedure is to partially dry the matrix within the press. The hydraulic pressure is then completely released, the partial vacuum in the vapor-exhausting plate being maintained while the entire assembly is moved from the press to the outermost position on the bed frame. Referring now to Figs. 5 and 5a, the assembly is next lowered by moving the hand lever 45 to its intermediate position shown in Figs. 5 and 5a in which position the form plate comes to rest on the heating table 53 where it remains until the matrix is completely dried. It will be understood from this description that with the application of heat at the bottom together with an application of suction at the top, pressure is applied to the drying form assembly by the action of atmospheric pressure on the imperforate top wall 35 of the vacuum plate, such pressure being proportional to the degree of suction maintained in the suction chamber 36.

From the foregoing specification, it will be understood that I have provided a novel method and means of novel construction for economizing time and effort in the production of stereotype matrices for high grade stereotype printing; that I have provided a novel method whereby the same or different steps in a matrix-molding method may be applied to different matrices at the same time; that I have provided a novel method and means of novel form whereby "double impressions" may be avoided; and that I have provided a novel method and means of novel construction whereby suction may be applied to the removal of aqueous vapor from the drying blankets in such a way as to produce pressure thereon by atmospheric pressure in proportion to the applied suction.

It will be seen furthermore that I have provided an improved duplex arrangement of matrix-dehydrating devices with respect to a central matrix-molding press.

It will be understood furthermore that I have produced a vacuum plate of novel form for providing pressure on a form-dehydrating assembly for drying matrices.

Having thus described my invention and pointed out the novel features residing therein, what I claim is:

1. The method of forming matrices for stereotype plates, which method consists in molding the matrices under relatively higher pressure and in drying said matrices under relatively lower pressure, and with the application during drying pressure of suction to remove the aqueous vapor.

2. The method of forming matrices for stereotypes, which method consists in molding moist flong under pressure to form the matrices, in discontinuing the pressure, in submitting the moist molded matrix to dehydration in a partial vacuum, and in applying thereto pressure proportional to the degree of said partial vacuum.

3. The method of forming matrices, which method consists in forming said matrices under suitable pressure, in relieving the molded matrices of the molding pressure, in applying suction to said matrices for removing the aqueous vapor therefrom, and finally in applying to said matrices atmospheric pressure in porportion to the degree of suction used for dehydrating the matrices.

4. The method of dehydrating a moist molded matrix for stereotypes, which method consists in subjecting one surface of said matrix to suction for exhausting the aqueous vapor therefrom, and in utilizing the suctional effects for producing atmospheric pressure on said matrix for expessing moisture therefrom thereby retaining all details therein and minimizing shrinkage thereof.

5. The method of forming matrices for stereotypes, which method consists in preparing a form, in applying flong to said form, in superimposing thereon molding and drying blankets, in applying a vapor vacuum plate to the assembly, in applying pressure to the assembly to mold the flong, in releasing the molding pressure, and in applying suction to the vacuum plate for dehydrating the matrices and blankets, and thereby applying atmospheric pressure to said vacuum plate to express the moisture from the matrix, to retain all the detail thereof, and to minimize the shrinkage thereof.

6. The method of forming matrices for stereotype printing plates, which method consists in applying the material of which the matrix is to be composed to the form, in applying a vapor-exhausting plate to the assembly, in subjecting the assembly to a relatively high pressure while exhausting the vapor therefrom to form the matrix, in reducing the pressure to a relatively lower pressure during the continued application of suction thereto, in maintaining the reduced pressure for a predetermined period of time while continuing the suction for partially dehydrating the matrix, in releasing the pressure while continuing the suction to complete the dehydrating action under reduced pressure induced by the vapor-exhausting plate.

7. In a machine for forming matrices for stereotypes, the combination with a matrix-molding press, of a heating plate distant from said press, and a matrix mold movable between positions respectively corresponding to matrix-molding and mold-heating operations to be performed thereon, said matrix mold comprising a mold-supporting plate and a vapor-exhausting plate movable into and out of engagement with the mold assembly on said mold-supporting plate, said vapor-exhausting plate being provided with suction intake openings located within a marginal sealing area formed between said vapor-exhausting plate and the blankets applied to the form.

8. In a machine for producing stereotype matrices, the combination with a matrix-molding press, of a mold-heating plate disposed without said press, a matrix mold comprising a form-supporting plate movable outwardly from said press to a position over said mold-heating plate and downwardly from said position into engagement with said heating plate, a form mounted on said form-supporting plate, and a vapor-exhausting plate movable outwardly from said press to a position over said form, and downwardly from said position.

9. In a machine for producing stereotype matrices, the combination with a matrix-molding press, of a mold-heating plate disposed without said press, a matrix mold movable outwardly from said press to a position over said mold-heating plate and downwardly from said position into engagement with said heating plate, said matrix mold comprising a form and a vapor-exhausting plate movable outwardly from said press to a position over said form and downwardly from said position into a position in which it rests upon the molding and drying blankets interposed therebetween, and means for raising and lowering said form-supporting and vapor-exhausting plates together and independently of each other.

10. In a machine for producing stereotype matrices, the combination with a matrix-molding press, of a mold-heating table arranged at a distance from said press, a form-supporting plate movable vertically into and out of engagement with said heating table and into and out of position to be operated on by said press, a form mounted on said form-supporting plate, a vapor-exhausting plate provided with suction slots, said vapor-exhausting plate being movable vertically into and out of sealing engagement with blankets covering the matrix-forming material on said form and movable into and out of position to be operated on by said press, said vapor-exhausting plate being provided with intake openings presented downwardly on to and covered by said blankets, and means for partially exhausting said suction chamber whereby aqueous vapor is drawn from said blankets and a partial vacuum created in said chamber whereby said vapor-exhausting plate is pressed into engagement with said blankets by atmospheric pressure due to the partial exhaustion of vapor from said suction slots.

11. In a machine for producing stereotype matrices, the combination with a centrally disposed matrix-molding press, of mold-heating tables arranged on opposite sides of said press, form-supporting plates movable vertically into and out of engagement with said heating tables at the outer ends thereof and into and out of position to be operated on by said press, forms mounted on said form-supporting plates, matrix-forming materials on said forms, molding and drying blankets on said materials, vapor-exhausting plates provided interiorly with a suction chamber, said vapor-exhausting plates being movable vertically into and out of engagement with the blankets carried by said forms and movable with said forms into and out of position to be operated on by said press, said vapor-exhausting plates being provided with suction slots presented downwardly on to and covered by said blankets, and means for partially exhausting said vapor-exhausting plates whereby aqueous vapor is drawn from said blankets and a partial vacuum produced in the space occupied by said blankets, said plates being pressed into engagement with said blankets by atmospheric pressure due to the partial exhaustion of vapor from said suction chamber.

CHARLES FRITSCHI.